United States Patent
Torok et al.

(10) Patent No.: US 8,378,562 B2
(45) Date of Patent: Feb. 19, 2013

(54) HYBRID COMPACT FLUORESCENT LAMP FIXING METHOD

(75) Inventors: Balazs Torok, Budapest (HU); Jozsef Fulop, Budapest (HU); Peter Mora, Budapest (HU); Peter Lucz, Budapest (HU)

(73) Assignee: General Electric Company, Schenectady, NY (US)

( * ) Notice: Subject to any disclaimer, the term of this patent is extended or adjusted under 35 U.S.C. 154(b) by 64 days.

(21) Appl. No.: 13/027,329

(22) Filed: Feb. 15, 2011

(65) Prior Publication Data

US 2012/0206030 A1 Aug. 16, 2012

(51) Int. Cl.
*H01J 5/48* (2006.01)
(52) U.S. Cl. .................................. 313/318.01; 313/46
(58) Field of Classification Search .. 313/318.01–318.1, 313/46, 151, 634, 1, 116; 445/23
See application file for complete search history.

(56) References Cited

U.S. PATENT DOCUMENTS

| 5,309,061 A * | 5/1994 | Bouchard et al. ............... 315/47 |
| 8,008,866 B2 * | 8/2011 | Newman et al. .............. 315/224 |
| 8,072,129 B2 | 12/2011 | Custodis et al. |
| 2007/0063656 A1 * | 3/2007 | Wursching et al. ........... 313/634 |
| 2010/0066260 A1 | 3/2010 | Newman, Jr. et al. |

FOREIGN PATENT DOCUMENTS

| DE | 102005032315 A1 | 1/2007 |
| GB | 2447495 A | 9/2008 |
| JP | 2007227342 A | 9/2007 |
| WO | 2009087729 A1 | 7/2009 |

OTHER PUBLICATIONS

PCT Search Report and Written Opinion dated Jun. 14, 2012 from corresponding Application No. PCT/US2012/024393.

* cited by examiner

*Primary Examiner* — Anne Hines
(74) *Attorney, Agent, or Firm* — Fay Sharpe LLP

(57) ABSTRACT

A lamp assembly provides both instant light through use of an incandescent/halogen lamp source and an energy saving type light provided by a compact fluorescent lamp source. Both light sources are fixed within the assembly by a fixing mechanism that spaces the lights sources from each other such that heat from one source does not negatively affect the second light source or any other portion of the assembly.

15 Claims, 4 Drawing Sheets

HYBRID COMPACT FLUORESCENT LAMP FIXING METHOD

BACKGROUND OF THE DISCLOSURE

This disclosure is directed to a lamp assembly, and particularly to a method of fixing a first light source and a second light source in a single lamp assembly. More specifically, the invention provides a lamp assembly and a mechanism for fixing at least two light sources therein, at least one of which is a compact fluorescent light source, an incandescent light source, or a halogen light source.

Lamps have been introduced recently that address certain problems pertaining to run-up behavior of compact fluorescent lamps, i.e., reducing the time to full light associated with starting or igniting fluorescent lamps. By way of example only, long-life compact fluorescent lamps need approximately 0.5 to 1.5 seconds to preheat the cathodes or electrodes before starting. Before preheating is complete, there is no light emission from the lamp. Once the arc discharge is initiated, the CFL still requires an additional approximately 20 to 120 seconds or more to reach full light output.

One proposed solution combines two light sources in one unit or lamp assembly. More particularly, a compact fluorescent light source and a conventional incandescent or halogen light source are combined in a single lamp assembly. The term "hybrid CFL lamp" or "hybrid lamp" has been used to refer to such lamp assemblies. By way of example, this type of lamp may be configured such that an incandescent or halogen light source is positioned within the spiral or double-helix of a compact fluorescent light source. An advantage gained by such arrangement is the immediate light generated by the incandescent or halogen light source, providing instantaneous light emission, while the CFL lamp simultaneously undergoes its warm-up period, which may last from 0.5 to 120 seconds. An added benefit of this hybrid lamp configuration is the use of heat generated by the incandescent or halogen light source, which is centrally positioned within the configuration of the CFL discharge tube, to heat the discharge tube of the CFL more efficiently, i.e. the mercury dose is more quickly vaporized by the additional heat.

While the foregoing lamp configuration addresses concerns regarding reduced light emission during lamp warm-up, it nonetheless has experienced a disadvantage or drawback with regard to the method and manner of fixing two different light sources within a single lamp assembly. Problems are encountered due to the difference in operating temperature of the two different light sources, and the affect of the heat of operation on the components of the light sources. For example, because a conventional CFL lamp does not generate as high operating temperatures as an incandescent or halogen lamp, it is generally manufactured to include a plastic collar in that portion of the lamp where the light source joins the power source. The plastic conventionally employed has a lower rated heat tolerance, suitable for use with CFL lamps that generate less heat. The hybrid lamp design, however, pairs the lower operating temperature CFL with a higher operating temperature incandescent or halogen lamp, thus rendering the lower temperature rated plastic collar susceptible to degradation caused by exposure to such high heat. Even in those lamps of the hybrid design that include a mechanism to control the higher temperature light source once the CFL lamp is sufficiently energized, such as a thermal sensor or switching mechanism for example, the heat generated by the instantaneous light source still deleteriously affects the plastic collar of the CFL lamp.

Attempts have been made to address this problem. For example, one means of controlling the heat generated by the instant start-up lamp in the hybrid configuration is to leave the lamp bare, i.e. not to use a lamp envelope or bulb to enclose the two light sources. This however is not as aesthetically pleasing as a lamp including an envelope or bulb, and a certain amount of the heat that is dissipated away from the instant start-up lamp in this type of bare arrangement that could be used to heat the CFL discharge tube is lost.

Other attempts to address the issues created by high temperature heat transfer to a low temperature rated plastic collar include the use of heat insulator structures, such as ceramics, cement, glue, and other materials that will fix the fixtures in the desired configuration and absorb some of the heat generated during the initial start-up of operation. These measures, however, can prove costly, and are cumbersome during lamp manufacture.

There remains a need, therefore, for a method suitable for use with hybrid lamp designs for fixing two different types of light sources within a single lamp assembly, as well as for reducing degradation of low temperature rated lamp components caused by exposure to high operating temperatures of another light source housed within the same lamp assembly.

SUMMARY OF THE DISCLOSURE

A lamp assembly of the present disclosure includes a first light source and a second light source, both disposed within a single lamp assembly, and a fixing mechanism that fixes the light sources in a predetermined compact configuration with respect to one another. The lamp assembly may, in some embodiments, include an outer envelope or bulb that encloses the first and second light sources of the lamp assembly.

There is also provided a method for forming a hybrid lamp assembly including providing a lamp base, disposing a first light source and a second light source in electrical connection with the base, providing a fixing mechanism, and fixing the position of the first and second light sources in a compact configuration using the fixing mechanism.

An embodiment of the lamp assembly includes a fluorescent light source and a halogen light source fixed in predetermined position with respect to one another. An envelope forms a cavity around at least the fluorescent and incandescent light sources. A clamp provides a mechanism by which the fluorescent and halogen light sources are fixed in a predetermined position with respect to one another.

The clamping mechanism may be composed of any suitable material that does not interfere with the operation of the lamp assembly. For example, the clamp may be a metal clamp, a ceramic clamp, a plastic clamp, or any other type of material that is formed into a desired shape for receiving and fixing in place a portion of the light sources.

In another embodiment, the lamp assembly includes the first light source and the second light source disposed adjacent one another, such that one of the light sources is substantially surrounded by the remaining light source. More particularly, in one embodiment the first light source is a spiral or double-helix CFL light source, and the second light source is a single tube halogen light source and is disposed within the spiral or double helix of the CFL discharge tube, and both light sources are fixed within a single lamp assembly by a clamping mechanism that attaches to the pinch portion of the halogen light source and then on two opposite sides of the pinch portion engages the legs of the CFL light source.

A method of assembling a lamp assembly includes providing a lamp base, mounting a first light source to the base, positioning a second light source adjacent the first light source, fixing the first light source and the second light source in a predetermined compact configuration by attaching a fixing mechanism to both light sources, and connecting the first light source and the second light source to a power control module for selectively terminating power to one of the light sources in response to a predetermined temperature of the remaining light source.

In one embodiment, the method includes providing a fluorescent light source as the first light source and a halogen or incandescent light source as the second light source, and disposing the second light source adjacent the first light source, such that the light emitting chamber of the first light source substantially surrounds the light emitting chamber of the second light source.

In another embodiment, the method includes employing a spiral or double helix fluorescent light source as the first light source. A halogen light source is employed as the second light source. The fixing mechanism is a metal clamp that includes a metal band that fits tightly around the perimeter of the pinch portion of the halogen light source and further includes flexible metal arms on opposite sides of the band, such that the arms can be squeezed together to allow the legs of the fluorescent light source to be positioned on opposite sides of the pinch portion of the halogen light source, and then upon release the arms press against the legs of the fluorescent light source, fixing the two light sources in the desired position.

A primary benefit of the present disclosure is the ability to fix two different light sources in a single lamp assembly in a manner such that the higher operating temperature of one light source does not deleteriously affect a component of the other light source during start up or operation.

Another benefit is associated with a simple construction that is easy to manufacture and is low cost.

Still other benefits and advantages of the present disclosure will become apparent upon reading and understanding the following detailed description.

DETAILED DESCRIPTION OF THE PREFERRED EMBODIMENTS

The invention is directed to a lamp assembly, and particularly to a method of fixing a first light source and a second light source in a single lamp assembly. More specifically, the invention provides a lamp assembly and a mechanism for fixing at least two light sources therein, at least one of which is a compact fluorescent light source, an incandescent light source, or a halogen light source.

While the following description of various embodiments of the invention are provided with reference to the inclusion of a compact fluorescent light source and a halogen light source in the lamp assembly, it is to be understood that either light source may be replaced by another suitable light source. For example, the halogen light source may be replaced by an incandescent light source or an LED light source. As such, the following disclosure and teaching with respect to the use of a halogen light source is equally applicable to the use of an incandescent, LED, or other light source.

Similarly, while the compact fluorescent light source is disclosed herein with reference to a spiral or double helix discharge tube configuration, other suitable configurations of the discharge tube may also benefit from the teaching herein. For example, CFL light sources having one or more U-shaped discharge tubes and known as multi-finger CFL light sources, and more particularly, for example, as quad-, hex-, and octo-multi-fingered light sources, may also be used herein. As such, the following disclosure and teaching with respect to the use of spiral or double-helix CFL light source is equally applicable to any configuration of a CFL discharge tube having legs that require or would benefit from being fixedly secured to a second light source positioned within the same lamp assembly.

Figure 1:
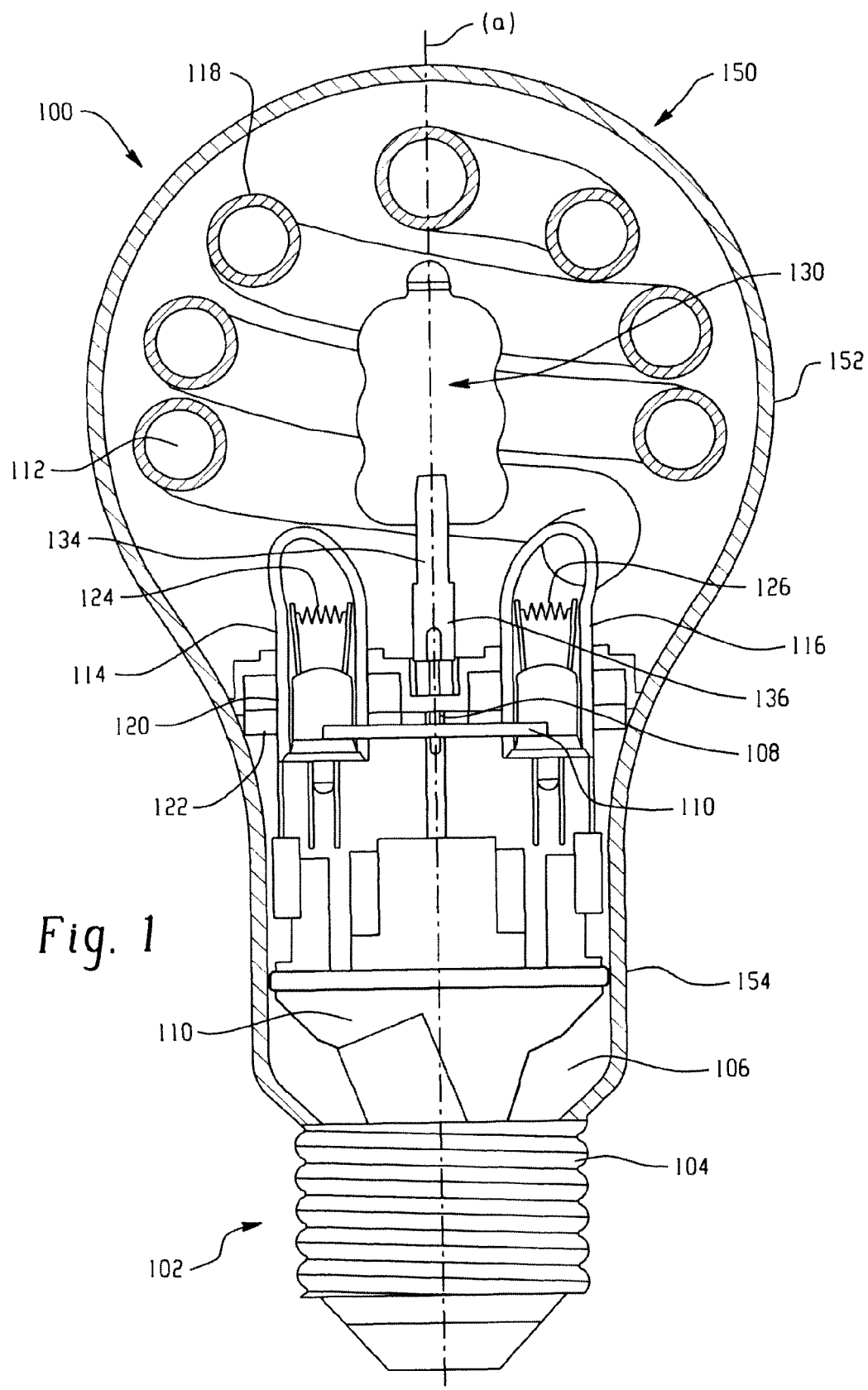
FIG. 1 is a cross-sectional elevation of the lamp assembly.
Figure 2:
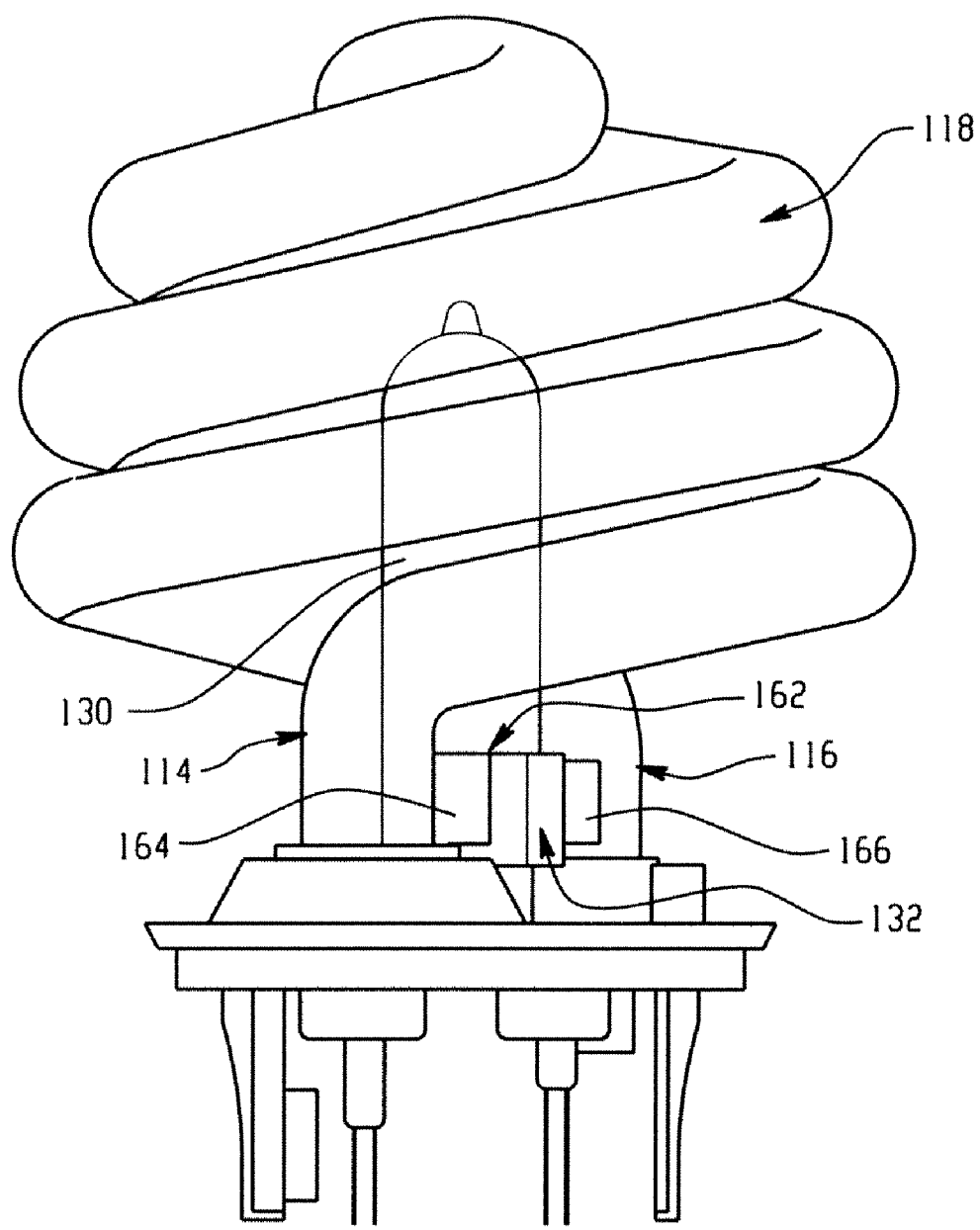
FIG. 2 is an elevation view of the lamp assembly.
Figure 4:
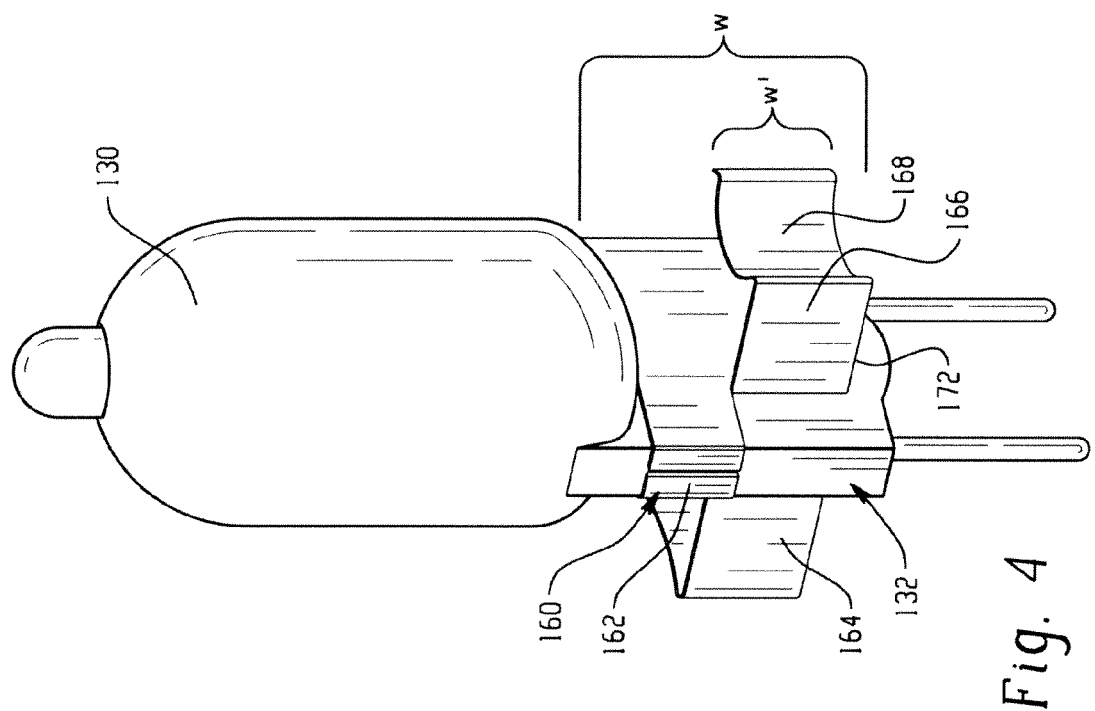
FIG. 4 is a side elevation of the halogen light source with a clamp fixing mechanism engaged to the pinch portion thereof.
Figure 3:
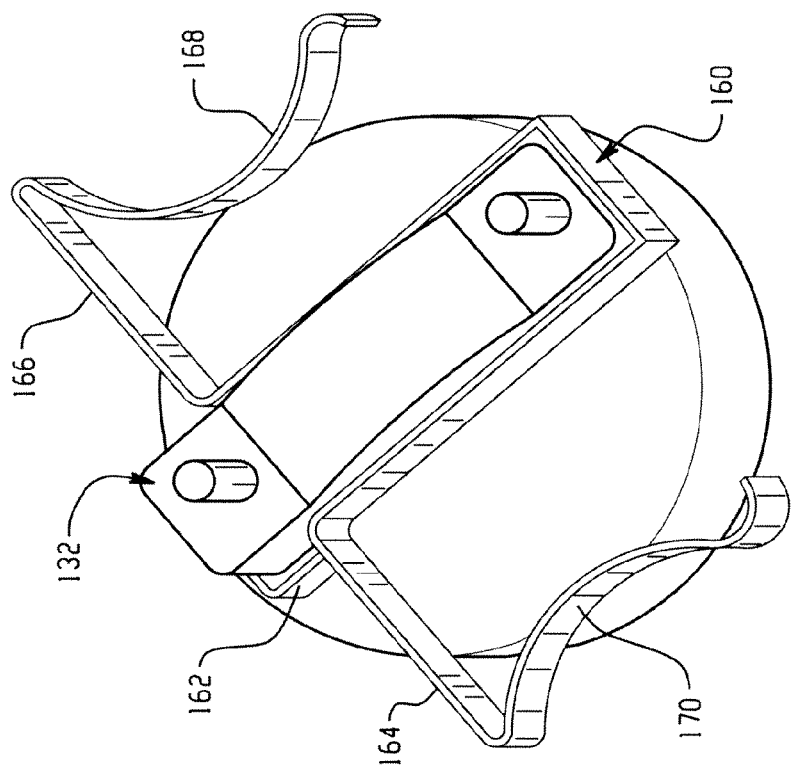
FIG. 3 is an enlarged view of the bottom of the halogen light source having a clamp fixing mechanism engaged with the pinch portion thereof.
Figure 5:
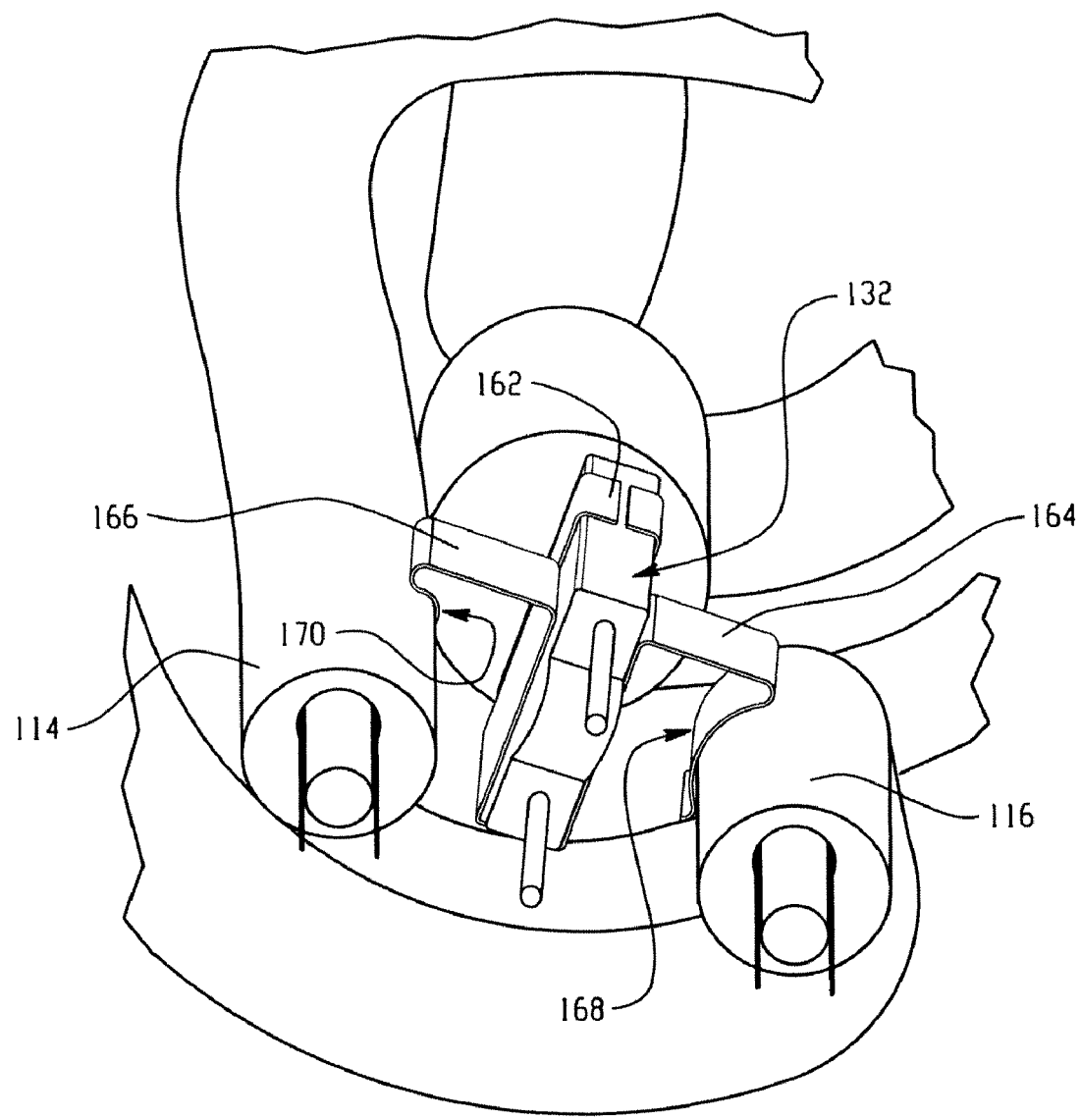
FIG. 5 is an enlarged view from the bottom of the clamp fixing mechanism engaged with the pinch portion of the halogen light source and the legs of the CFL light source.

FIG. 1 provides a cross-sectional elevation of a lamp assembly, and more particularly a compact fluorescent lamp assembly 100 that is generally referred to as an energy saving lamp or light source that advantageously provides instant light and fast warm-up. FIG. 2 provides an elevational view of the lamp of FIG. 1, not in cross-section. Remaining FIGS. 3-5 provide enlarged views of certain portions of the lamp of FIGS. 1 and 2. As such, in all Figures like numerical references are used to denote like features.

Now, with reference to FIGS. 1 and 2, there is provided a lamp assembly 100 including lamp base 102 housing a mechanical and electrical arrangement for receipt in an associated lamp socket (not shown) to mechanically support the lamp assembly 100 and provide power to operate the lamp assembly. More particularly, and without need to be limiting, a conventional Edison-base 102 is shown that includes a conductive, threaded metal shell 104 for threaded receipt in an associated lamp socket, and typically includes an electrical eyelet or second contact (not shown) spaced from the threaded shell 104 by insulating material at the lower end of the lamp assembly. This arrangement provides a two lead arrangement for establishing electrical contact associated with the lamp socket in a manner generally known in the art.

At least a portion of the lamp base forms a compartment or inner cavity 106 that receives a power control module, such as ballast 110, which allows an AC source to drive the lamp sources or light emitting components of the lamp assembly 100. Mounted to the lamp base is a first, for example a fluorescent, light source 112. The illustrated fluorescent light source has a spiral configuration or double-helix arrangement that includes first and second legs 114, 116 positioned in holder 120 and further supported in collar 122, legs 114, 116, having lower portions that extend in substantially parallel relation to a longitudinal axis (a) of the lamp assembly. The legs are disposed adjacent the power control module or ballast in order to provide ease of connection. Intermediate the first and second legs 114, 116, a remainder of discharge tube 118 adopts a generally spiral configuration of the compact fluorescent light source. A fill gas is sealed within the discharge tube, and electrodes or cathodes 124, 126 are provided in the respective legs 114, 116, and thus located at opposite ends of an elongated discharge path that extends through the length of the spiral discharge tube. As is known in the art, an arc is initiated between the cathodes and light emitted from the ionized fill is emitted as visible light in a desired color by passing through a phosphor provided on an inner surface of the discharge tube. It is understood that the first light source, if it is a compact fluorescent light source, may have a number of other configurations, as is stated above.

A second, for example halogen, light source 130, or an incandescent or tungsten halogen light source having a filament (not shown), is electrically connected to lamp ballast 110 by lead-in wire 108. In another preferred arrangement, the second light source is a tungsten halogen lamp. As illustrated in FIG. 1, the second light source is a single ended source that is centrally located within a hollow interior region formed within the spiral portion of the CFL 112. Particularly, pinch portion 132 of the second light source 130, having lower pinch portion 136 and upper pinch portion 134 that is closer to light source 130, is received in collar 122. This collar 122 also separates the compartment of the lamp base that houses the power control module from the light emitting portions of the first and second light sources 112, 130. The lamp sources are also preferably housed or enclosed within a common envelope or outer bulb 150. The bulb is dimensioned to enclose the first source 112 and the second source 130 within its hollowed, generally spherical portion 152 and the bulb has a reduced dimension as it proceeds for sealed engagement with the lamp base along a necked-down region 154.

With reference now to FIGS. 3-5, a fixing mechanism 160, such as a clamp, is mounted on the pinch portion 132 of the second light source. The fixing mechanism or clamp 160 includes, for example, a band 162 substantially encircling and in contact with the perimeter of the pinch portion 132. Band 162 has a width (w). A portion of the band is bent away from the pinch portion 132 and forms arms 164, 166 on opposite sides of the band. In one embodiment, arms 164, 166 extend away from the band, which encircles almost completely the pinch portion, on either side thereof and then continue as curvilinear portions 168, 170 in keeping with the exterior contour of the legs 114, 116 of the first light source. The curvilinear portion 168, 170 may be flexible so that during positioning of the fixing mechanism or clamp, the curvilinear portions can be squeezed or pinched toward pinch portion 132, and then released to contact legs 114, 116 and secure the same in a predetermined position with respect to the second light source.

In a preferred embodiment, fixing mechanism 160 is a metal clamp, and thus has the desired flexibility. In an alternative embodiment, fixing mechanism 160 may be comprised of a suitable plastic capable of flexurally engaging legs 114, 116 of the first light source. In yet another embodiment, fixing mechanism 160 may comprise less flexible material, for example a ceramic material. In this latter scenario, because ceramic is not generally resiliently flexible, as is the case with metal or plastic alternatives, curvilinear portions 168, 170 may instead encircle completely or partially the outer perimeter of legs 114, 116. With this design, fixing mechanism 160 may be slipped over pinch portion 132 and legs 114, 116 during manufacture.

As stated above, fixing mechanism 160 has a width (w). Arms 164, 166 have a width (w') that is less than (w), and bend away from the pinch portion 132 on the lower edge 172 of fixing mechanism 160, away from the light-emitting portion of the second light source. Portion 162 of fixing mechanism 160 may have a width of about 3 mm in a standard lamp configuration. The width of this portion of the fixing mechanism should be enough to ensure that the plastic collar 122 supporting legs 114, 116 is spaced apart from the light and heat-emitting portion of light source 140 and is thus protected from heat-induced degradation and deformation.

In one embodiment, the first light source is a CFL light source, and the second light source is a halogen light source. The halogen light source 130 provides an instant light type of light source when power is switched on to the lamp assembly 100. Moreover, the halogen light source heats up both the mercury reservoir and the entire discharge vessel of the energy saving type of light source or compact fluorescent light source 112. The heat from the halogen light source results in a faster evaporation of the mercury from the mercury reservoir into the discharge vessel. Thus, upon switching on the lamp assembly, power is provided to both of the light sources, and the halogen light source 130 provides instant light and also provides desired heat to warm-up the fluorescent lamp source 112. Once the fluorescent lamp source is ignited, the heat also aids in the faster evaporation of the mercury and reduces the run-up time to a full light or steady state operation of the fluorescent lamp source 112. This heat may, however, adversely affect plastic holder 120 and collar 122, causing degradation or deformation. As set forth above, fixing mechanism 160 addresses this issue by ensuring that plastic holder 120 and collar 122 are sufficiently spaced from heat generated by the halogen light source to reduce any negative effects.

Both light sources are preferably located within the common outer bulb 150. This allows the arrangement to achieve the shortest warm-up period by reducing the loss of heat to the external environment. However, the first and second light sources may also be positioned within the lamp assembly as defined above, without a common outer bulb 150, or in a bare lamp arrangement.

The disclosure has been described with respect to preferred embodiments. Obviously, modifications and alterations may be contemplated by one skilled in the art, and the subject disclosure should not be limited to the particular examples described above but instead through the following claims.

What is claimed is:

1. A lamp assembly comprising:
a lamp base having a mechanism for establishing an electrical connection to an external power source;
a first light source having two or more legs positioned by a holder further supported by a collar; and
a second light source having a pinch portion and mounted to a clamp fixed to the two or more legs of the first light source;
wherein the clamp secures the first and second light sources in a fixed position relative to one another, and spaces the second light source from the holder and collar such that heat generated by the second light source does not adversely affect the integrity of the holder or collar, and the clamp includes a first portion that engages at least a portion of the pinch portion of the second light source, and the clamp includes a second portion that engages at least a portion of a surface of the legs.

2. The lamp assembly of claim 1 further including an envelope forming a cavity around at least the first and second light sources.

3. The lamp assembly of claim 1 wherein the first light source is a compact fluorescent light source.

4. The lamp assembly of claim 3 wherein the compact fluorescent light source has a discharge tube having a spiral or double helix configuration, the tube terminating at each end in said legs, the legs being positioned substantially parallel to the longitudinal axis of the lamp assembly.

5. The lamp assembly of claim 4 wherein the second light source is a halogen light source and is substantially surrounded within the lamp assembly by the first light source.

6. The lamp assembly of claim 5 wherein the clamp first portion attaches to a perimeter of the pinch portion of the halogen light source and the clamp second portions are disposed on opposing sides of the first portion that engage at least a surface of the legs of the compact fluorescent light source.

7. The lamp assembly of claim 6 wherein the clamp is a metal clamp and the second portions are flexibly engaged with the legs of the fluorescent light source.

8. The lamp assembly of claim 3 wherein the compact fluorescent light source has a multi-finger configuration.

9. The lamp assembly of claim 1 wherein the collar is formed from a low temperature rated plastic.

10. A method of assembling a lamp assembly comprising:
providing a lamp base;
mounting a first light source within the lamp base, the first light source having two or more legs that descend in parallel relation to the longitudinal axis of the lamp assembly into the lamp base and are positioned by a holder and supported by a collar;
positioning a second light source adjacent the first light source;
fixing the first light source and the second light source in a predetermined compact configuration by attaching a clamp to both light sources that spaces the light sources from one another such that heat of operation of one of the light sources does not degradingly affect the other of the light sources, the clamping having a first portion that encircles at least a portion of a pinch portion of the second light source and the clamp having second portions that engage at least a portion of the surfaces of the legs of the first light source; and
connecting the first light source and the second light source to an associated external power source.

11. The method of claim 10 further including the step of providing an envelope that encases the first and second light sources.

12. The method of claim 10 wherein the first light source is a compact fluorescent light source and the second light source is a halogen light source.

13. The method of claim 12 wherein a light emitting portion of the compact fluorescent light source substantially surrounds a light emitting portion of the second light source.

14. The method of claim 12 wherein the clamp first portion encircles a pinch portion of the halogen light source and the second portions on opposing sides of the first portion engage at least a surface of the legs of the compact fluorescent light source.

15. The method of claim 10 wherein the collars comprise low temperature rated material and the second light source emits heat of operation above the low temperature rating of the collar material.

* * * * *